(12) United States Patent
Anderson

(10) Patent No.: US 7,440,848 B2
(45) Date of Patent: Oct. 21, 2008

(54) METHODS AND SYSTEMS FOR INTEGRATING ENVIRONMENTAL DATA WITH MOBILE ASSET TRACKING

(75) Inventor: Steven P. Anderson, North Falmouth, MA (US)

(73) Assignee: Horizon Marine, Marion, MA (US)

( * ) Notice: Subject to any disclaimer, the term of this patent is extended or adjusted under 35 U.S.C. 154(b) by 0 days.

(21) Appl. No.: 11/754,502

(22) Filed: May 29, 2007

(65) Prior Publication Data

US 2007/0282560 A1    Dec. 6, 2007

Related U.S. Application Data

(60) Provisional application No. 60/803,392, filed on May 30, 2006.

(51) Int. Cl.
*G01C 21/00* (2006.01)

(52) U.S. Cl. .................. 701/207; 701/213; 701/300

(58) Field of Classification Search ......... 701/200–213, 701/300; 342/357.01–357.14
See application file for complete search history.

(56) References Cited

U.S. PATENT DOCUMENTS

| | | | |
|---|---|---|---|
| 3,875,388 A | 4/1975 | Luten et al. | |
| 3,881,095 A | 4/1975 | Taylor et al. | |
| 4,253,150 A | 2/1981 | Scovill | |
| 5,089,816 A | 2/1992 | Holmes, Jr. | |
| 5,214,757 A | 5/1993 | Mauney et al. | |
| 6,308,649 B1 | 10/2001 | Gedeon | |
| 6,314,362 B1 | 11/2001 | Erzberger et al. | |
| 6,339,745 B1 | 1/2002 | Novik | |
| 6,606,553 B2 * | 8/2003 | Zobell et al. | 701/120 |
| 6,845,324 B2 | 1/2005 | Smith | |
| 6,933,884 B2 | 8/2005 | Martin et al. | |

* cited by examiner

Primary Examiner—Richard M. Camby
(74) Attorney, Agent, or Firm—Brian M. Dingman; Kathryn V. Chelini; Mirick, O'Connell, DeMallie & Lougee

(57) ABSTRACT

Systems and methods for integrating position reports from mobile assets with real time environmental data aggregated from various sources to build and continually update, in real time, an amalgamated database that contains the position information and collocated environmental parameters. The amalgamated database may be queried, and the extracted information may be processed for analysis and displayed or reported to a user.

20 Claims, 4 Drawing Sheets

POSITION REPORT

| FIELD | VALUE |
|---|---|
| VESSEL_NAME | "Kathleen" |
| TRACKING_ID | "4882" |
| SPEED | "10,9433" |
| LONGITUDE | "-70.62" |
| LATITUDE | "40,1944" |
| HEADING | "168.4685" |
| DATE_TIME | "16-Jun-2005 22:16:00" |

— 112

220

THREE DIMENSIONAL INTERPOLATION
(LATITUDE-LONGITUDE-TIME)

GRIDDED SURFACE WINDS
FROM NAM FORECAST MODEL

TIME

LATITUDE

LONGITUDE

POSITION REPORT WITH COLLOCATED
ENVIRONMENTAL PARAMETERS

| FIELD | VALUE |
|---|---|
| VESSEL_NAME | "Kathleen" |
| LATITUDE | "40,1944" |
| LONGITUDE | "-70.62" |
| DATE_TIME | "16-Jun-2005 22:16:00" |
| SPEED | "10,9433" |
| HEADING | "168.4685" |
| TRACKING_ID | "4882" |
| NAM_WINDSPEED | "14.8" |
| NAM_WINDDIR | "93.3" |
| WAM_WAVEHEIGHT | "3.6" |
| AVHRR_SST | "23.4" |
| HYCOM_CURRENTSPD | "0.75" |
| HYCOM_CURRENTDIR | "210.2" |

— 230

COLLOCATED
ENVIRONMENTAL
DATA FIELDS

FIG. 2

METHODS AND SYSTEMS FOR INTEGRATING ENVIRONMENTAL DATA WITH MOBILE ASSET TRACKING

CROSS REFERENCE TO RELATED APPLICATION

This application is based upon and claims the benefit of priority from U.S. provisional application No. 60/803,392 filed May 30, 2006, the entire contents of which are incorporated by reference herein.

FIELD OF THE INVENTION

This invention relates generally to the field of tracking the position of mobile assets and correlating the positions of the mobile assets with environmental data. More specifically, this invention relates to tracking vessel locations, correlating vessel locations with real time meteorological and oceanographic data, and providing the user with tools to analyze, display and report the resulting collocated information

BACKGROUND OF THE INVENTION

Asset tracking, such as vessel tracking, can be accomplished anywhere in the world using Global Positioning Systems (GPS) in conjunction with advanced communications systems. Typical tracking systems combine remote tracking hardware, data telemetry, shore-based data assembly, and mapping software to provide users with real time monitoring of individual boats or fleets of vessels. Although many vessels have some onboard instruments to measure environmental parameters such as wind speed and direction, this information is rarely included with the GPS telemetry because of high system integration and communications costs. However, having quick access to position information that is collocated, in both space and time, with environmental parameters, including such meteorological and oceanographic parameters as wind speed and direction, sea state, and ocean currents, can provide users with a more complete picture of the environmental conditions encountered by the vessel. The environmental information is useful in both vessel performance assessment and fleet management.

SUMMARY OF THE INVENTION

The present invention provides systems and methods for integrating position reports from mobile assets with real time environmental data aggregated from various sources to build and continually update, in real time, an amalgamated database that contains the position information and collocated environmental parameters. The amalgamated database may be queried, and the extracted information may be processed for analysis and displayed or reported to a user.

In an embodiment, the inventive method allows a user to query the position of a mobile asset over time, along with environmental data associated with the position of the mobile asset. The method includes receiving position reports from a mobile asset, where each position report includes at least the position of the mobile asset. Each position report is associated with a timestamp. The method further includes receiving environmental data reports from various data sources, where each environmental data report includes at least an environmental data value and an associated location. Each environmental data report is also associated with a timestamp. The position report and the environmental data report are correlated by comparing the mobile asset position and timestamp with the location and timestamp of the environmental data, and the correlated report is stored in an amalgamated database. The amalgamated database can be queried and the extracted data can be analyzed, displayed and reported to a user.

BRIEF DESCRIPTION OF THE DRAWINGS

Other objects, features and advantages will occur to those skilled in the art from the following description of the preferred embodiments and the accompanying drawings, in which:

FIG. 2 illustrates correlating a position report with environmental data by using a three dimensional interpolation to extract oceanographic data collocated in space and time with the position report in accordance with the invention of FIG. 1;

DESCRIPTION OF THE PREFERRED EMBODIMENTS

The present invention provides systems and methods for integrating position reports from mobile assets with real time environmental data aggregated from various sources to build and continually update, in real time, an amalgamated database that contains position information and collocated environmental parameters. The amalgamated database may be queried, and the extracted information may be processed for analysis and displayed or reported to a user.

The preferred embodiment of the present invention is applicable to any vessel. As used in this specification, the term "vessel" refers to any sea-going vessel, including salt water and fresh water vessels, and can be used interchangeably with the terms sailboat, boat, ferry, fishing vessel, ship, platform, yacht, and vehicle. However, the present invention is not limited to vessels, and is applicable to all types of mobile assets. For example, the present invention may be used with barges, trucks, and trailers as well as other vehicles and assets. Further, the present invention may be used for tracking mobile individuals or animals whose movements may be effected by the environment. For example, the present invention may be used for tracking a kayaker during a long distance expedition or tracking marine mammal migrations as part of a scientific study.

As used in this specification, the term "environmental" refers to any data that quantifies meteorological or oceanographic parameters. The preferred embodiment is disclosed in connection with wind speed and direction, sea state and direction (wind waves and swell), ocean currents, and sea surface temperature. However, the present invention is applicable to all types of meteorological and oceanographic parameters. For example, a fishing vessel position can be combined with ocean chlorophyll observations to determine the amount of time spent fishing in regions of high primary productivity. In another example application, vessel position can be combined with solar irradiance to quantify sunlight available for solar power.

The present invention may be used with any type of tracking system, including but not limited to tracking systems that use GlobalStar, Inmarsat, Iridium, OrbComm, Service Argos, SMS, Mobitex, or 900 MHZ radio modems. The tracking systems may use any type of communications to telemeter position information including, but not limited to, RF transceivers, wide-area wireless data networks, or satellite data networks. In the preferred embodiment, the position information is communicated in digital format.

Figure 1:
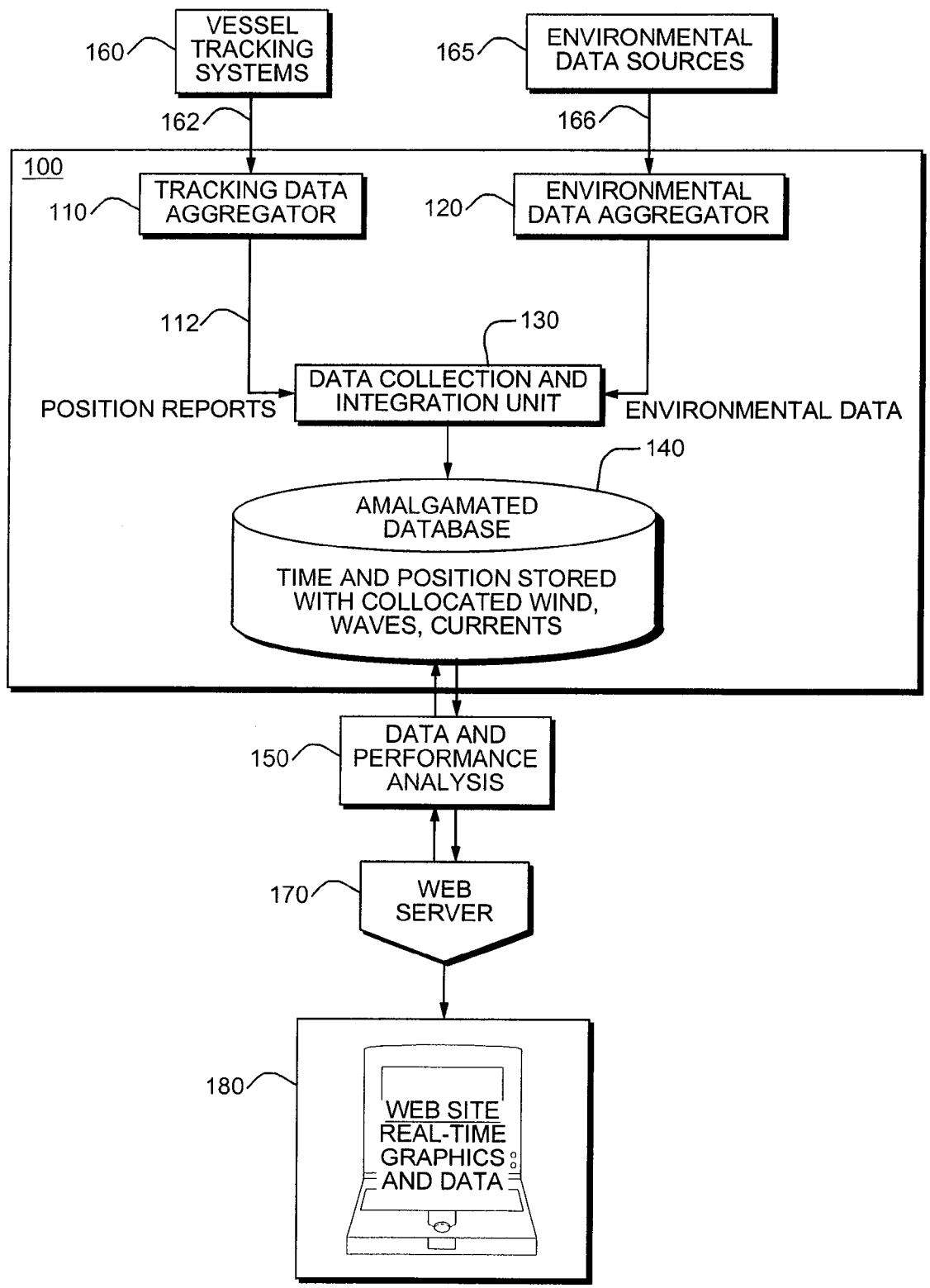
FIG. 1 is a simplified flowchart of a preferred embodiment of the method and system for integrating environmental data with asset tracking information in accordance with the present invention.

A simplified flowchart of the preferred embodiment of the invention is shown in FIG. 1, in which system 100 comprises the following components: Tracking Data Aggregator 110, Environmental Data Aggregator 120, Data Collocation and Integration Unit 130, Amalgamated Database 140, and Data Performance and Analysis Tools 150.

Tracking Data Aggregator

As shown in FIG. 1, Tracking Data Aggregator 110 collects position reports 162 with different data formats and protocols from vessel tracking systems 160, reformats the collected position reports 162 to a common format, and forwards the formatted position reports 112 to Data Collocation and Integration Unit 130. Tracking Data Aggregator 110 is comprised of a computer, software, and communications network. In the preferred embodiment, Tracking Data Aggregator 110 includes a networked computer running a Windows-based operating system and custom software programs written in MATLAB, PERL and PHP programming languages.

In the preferred embodiment, Tracking Data Aggregator 110 communicates with vessel tracking systems 160 via the Internet and requests and receives position reports 162 from vessel tracking systems 160 in real time. Communications between Tracking Data Aggregator 110 and vessel tracking systems 160 may be made via standard network protocols such as File Transfer Protocol (FTP), electronic mail, Hypertext Transfer Protocol (HTTP), TELNET, or any non-standard, application specific protocol. Most tracking service providers use their own unique protocols for exchanging data. For example, Service Argos uses TELNET, and Tracking Data Aggregator 110 initiates automated TELNET session to retrieve recent transmissions, in which the data format is a non-standard hexadecimal format. In alternative embodiments, Tracking Data Aggregator 110 may also communicate with vessel tracking systems 160 via a phone line, radio frequency modem, satellite modem, or any other type of data telemetry network.

In the preferred embodiment, position reports 162 contain at least the date and time of the position report and a vessel position or location expressed as a latitude and a longitude. The date and time of the position report may be included in the position report as received from the vessel tracking systems 160, or position reports may be time-stamped when received by Tracking Data Aggregator 110. Position reports 162 may also contain related ancillary data, including but not limited to vessel speed and heading, and tracking system diagnostic information, such as the number of satellites used by the GPS to calculate the vessel position.

Tracking Data Aggregator 110 processes and reformats position reports 162 into a common format. In a preferred embodiment, the resulting information is stored in a common PostgreSQL database, although any similar type or relational database may be used. As shown in FIG. 2, in the preferred embodiment, the common format for position reports 112 includes the following fields: an alphanumeric vessel name, a four-digit vessel tracking identifier, a vessel speed, a vessel position expressed as a longitude and a latitude, a vessel heading, and a date and time. The invention is not limited to these fields, and additional fields are contemplated and within the scope of the invention. For example, additional fields may include diagnostic information such as internal battery levels, intrusion alarms, and the accuracy of the GPS fix, and environmental parameters such as barometric pressure and sea surface temperature. As shown in FIG. 1, Tracking Data Aggregator 110 sends the common format position reports 112 to Data Collection and Integration Unit 130.

Environmental Data Aggregator

With further reference to FIG. 1, Environmental Data Aggregator 120 collects environmental data reports 166, including meteorological and oceanographic data, with different data formats and protocols from a variety of environmental data sources 165, reformats the collected environmental data reports 166 to a common format, and stores the formatted environmental data reports for use by the Data Collection and Integration Unit 130. In a preferred embodiment, Environmental Data Aggregator 120 receives environmental data reports 166 in real time from sources other than the assets being tracked. The present invention, however, is not limited by the source of the environmental data. In alternative embodiments, real time environmental data may also be collected from the assets being tracked.

Environmental Data Aggregator 120 is comprised of a computer, software, and a communications network. In the preferred embodiment, Environmental Data Aggregator 120 includes a networked computer running a Windows-based operating system and custom software programs written in MATLAB and PERL programming languages. In the preferred embodiment, computer programs and scripts written in MATLAB and PERL are used to process the environmental report data.

In the preferred embodiment, Environmental Data Aggregator 120 communicates with environmental data sources 165, including government, educational, and private sector sources, via the Internet. Communications between Environmental Data Aggregator 120 and environmental data sources 165 may be made via standard network protocols such as FTP, HTTP, Distributed Ocean Data Services, and the Live Access Services, or any other standard or non-standard protocol used for storing or distributing environmental data.

Environmental Data Aggregator 120 collects the following types of meteorological and oceanographic data:

weather prediction surface level wind and wave forecasts from the National Center for Environmental Prediction (NCEP);

wind and wave forecasts from InpactWeather, Inc.;

satellite sea surface temperature imagery from Louisiana State University and the National Oceanic and Atmospheric Administration (NOAA);

satellite ocean chlorophyll imagery from the National Aeronautics and Space Administration (NASA);

ocean current forecasts from the Naval Research Laboratory (NRL); and ocean current observations from the Minerals Management Service, and offshore wind and wave measurements from the National Data Buoy Center.

The present invention is not limited to the preceding list, and additional types of meteorological and oceanographic data are contemplated and within the scope of the invention. In the preferred embodiment, Environmental Aggregator 120 collects the following satellite data sets:

sea surface temperature observations from the Advanced Very High Resolution Radiometer (AVHRR) spaceborne sensor on the NOAA polar orbiting satellites (http://www.oso.noaa.zov/poes/);

infrared images from the NOAA Geostationary Operational Environmental Satellite (http://www.oso.noaa.gov/goes/index.htm);

forecasts for surface winds and pressure from the National Center for Environmental Prediction North American Mesoscale model and the NCEP Global Forecast System model (http://www.emc.ncep.noaa.gov/);

wave forecasts from NOAA's Operational wave model (http://polar.ncep.noaa.gov/waves/);

ocean current forecasts from National Research Laboratory (NRL) Hybrid Coordinate Ocean Model (HYCOM) (http://www7320.nrlssc.navv.mil/ATLhycoml-12/skill.html); and in situ wind and wave measurements from the NOAA National Data Buoy Center (http://www.ndbc.noaa.gov/).

Environmental Data Aggregator 120 reformats the environmental data into a common format. In the preferred embodiment, the common format for environmental data includes the following fields: windspeed, wind direction, wave height, wave direction, barometric pressure, sea surface temperature, ocean surface current speed and ocean surface current direction. The invention is not limited to these fields, however, and additional fields are contemplated and within the scope of the invention, including solar radiation (useful for gauging the amount of light available for solar powered devices), relative humidity, fog, ocean surface salinity, and ocean chlorophyll (useful for fisheries). Environmental Data Aggregator 120 stores the common format environmental reports for use by the Data Collection and Integration Unit 130.

In the preferred embodiment, Environmental Data Aggregator 120 collects two types of environmental data reports 166. The first type of environmental data collected by Environmental Data Aggregator 120 is point measurement data or observation from a specific station. Point measurement data provides temporal variability of environmental parameters and includes, but is not limited to, wind observations collected from anemometers mounted on moored weather buoys or coastal stations; ocean current measurements from currents meter mounted on moored weather buoys, drills ships and oil production platforms; wave observations from moored weather buoys; and weather observations collected by the National Oceanic and Atmospheric Administration Volunteer Observing Ship program. Additional point measurements include drifting oceanographic buoys, oceanographic gliders, oceanographic autonomous profilers, tide gauges, and other measurement systems. In the preferred embodiment, point measurement data includes at least an identifier and location for the associated measurement site and a date and time associated with the measurement.

A sample point measurement from NOAA National Data Buoy Center buoy #44008 located 54 NM southeast of Nantucket contains the following information:
Time: 1650 GMT May 15, 2007
Wind Direction (WDIR): SW (220 deg true)
Wind Speed (WSPD): 21.4 kts
Wind Gust (GST): 27.2 kts
Wave Height (WVHT): 5.2 ft
Dominant Wave Period (DPD): 6 sec
Average Period (APD): 4.4 sec
Mean Wave Direction (MWD): WSW (258 deg true)
Atmospheric Pressure (PRES): 29.98 in
Pressure Tendency (PTDY): −0.09 in (Falling)
Air Temperature (ATMP): 54.0° F.
Water Temperature (WTMP): 49.3° F.
Dew Point (DEWP): 46.4° F.

The second type of environmental data collected by Environmental Data Aggregator 120 is gridded data. Gridded data describes both spatial and temporal variability of environmental parameters. With reference to FIG. 2, gridded data sets 220 contain meteorological and/or oceanographic parameters on a spatial grid that is updated at standard time intervals. In the preferred embodiment, the gridded data is a product of numerical weather prediction, numerical ocean prediction, and satellite observations. The present invention is not limited to these data sets, however, and additional gridded environmental data sets, including but not limited to data from a network of High Frequency radars that measure ocean currents and waves, are contemplated and within the scope of the invention. In the preferred embodiment, a gridded data set includes at least an identifier, and a location, expressed as a longitude and a latitude, for each data point in the data set, and a date and time associated with the data set.

A sample gridded data set is the AVHRR image data received in Hierarchical Data Format ("HDF") a multi-object file format maintained by the National Center for Supercomputing Applications (NCSA). The AVHRR Sea Surface Temperature fields in the HDF data files are as follows:
Name: sst Dimensions:
Name: rows Size: 1101
Name: cols Size: 1401
Precision: int16 long_
name: sst
units: celsius
coordsys: Mercator
FillValue: −32768
missing_value: −32768
scale_factor: 0.01
scale_factor_err: 0
add_offset: 0
add_offset_err: 0
calibrated_nt: 0
fraction_digits: 2
sst_equation_day: linear split window
sst_equation_night: linear split window Data Collection and Integration Unit Data Collection and Integration Unit 130 collects formatted position reports 112 from Tracking Data Aggregator 110 and merges the position information with formatted environmental data stored in the Environmental Data Aggregator 120. The merged data are stored in the Amalgamated Database 140.

In the preferred embodiment, the Data Collection and Integration Unit 130, upon receipt of a formatted position report 112 from Tracking Data Aggregator 110, retrieves environmental data from the Environmental Data Aggregator 120 that is collocated in time and space with the formatted position report 112. In alternate embodiments, the Data Collection and Integration Unit 130 may be scheduled to execute once on command, or execute at regularly scheduled intervals.

If the environmental data is point measurement data, the Data Collection and Integration Unit 130 searches for the measurement site that is closest to the vessel by comparing the location of each measurement site with the vessel location in the position report. If a measurement site is found, the Data Collection and Integration Unit 130 then determines if the selected measurement site is within a preset location range threshold for that measurement site. If the difference between the measurement site location and the vessel location in the position report is too large (larger than the preset location range threshold), then the environmental data are considered too far away in space and not relevant to the position report. In this case, no environmental data is extracted from Environmental Data Aggregator 120.

If, however, the vessel location is sufficiently close to the measurement site location, the Data Collection and Integration Unit 130 then determines if the measurement date and time is within a preset time range threshold. If the difference between the time and date of the measurement and the time and date of the position report is too large (larger than the preset time range threshold), then the environmental data are considered too far away in time and not relevant to the position report. In this case, no environmental data are extracted from Environmental Data Aggregator 120. If, however, the time and date of the environmental data is within the preset range thresholds for location and time, the environmental data, along with the identifying information for the selected measurement site, is stored in the Amalgamated Database 140. In the preferred embodiment, the preset range thresholds for location and time are determined by the system administrator, although in other embodiments, the preset range thresholds for location and time may be determined by the user.

If the environmental data is gridded data, the Data Collection and Integration Unit 130 performs a two-dimensional (latitude-longitude) or three dimensional (latitude-longitude-time) interpolation to extract the environmental parameters associated with the position report. As with point measurements, gridded data may be associated with preset range thresholds for location and time, and environmental data is extracted from Environmental Data Aggregator 120 only if the environmental data are within these preset range thresholds. In addition, as with point measurement data, the preset range thresholds for location and time are determined by the system administrator, although in other embodiments, the preset range thresholds for location and time may be determined by the user.

An example of a three dimensional interpolation is shown in FIG. 2, in which Environmental Data Aggregator 120 collects gridded data set 220, which represents wind forecasts from the National Weather Service's North American Model (NAM) (formerly known as the ETA model). The NAM model includes surface (where surface is defined as within 10 meters of the water surface, a standard measurement height) wind speed and direction nowcasts and forecasts on a latitude-longitude grid that covers North and South America and surrounding coastal waters. The NAM model is updated every six hours and provides forecasts out to 96 hours at one-hour intervals. Data Collection and Integration Unit 130 interpolates the NAM model gridded data fields to the time and location included in position report 112. In the preferred embodiment, nearest-neighbor or linear interpolation is used, however, other types of interpolation are contemplated and within the scope of the invention. The interpolated wind speed and direction are then combined with the position report and the collocated information 230 is stored in Amalgamated Database 140.

Another example of a gridded data set is the NOAA AVHRR Sea Surface Temperature observations from polar orbiting satellites. A specific region of the ocean may be imaged several times a day. Environmental Data Aggregator 120 collects the individual image reports, forms a composite of the day's images, and makes the most recent composite image available to Data Collection and Integration Unit 130.

Since clouds will block the satellites' view of the ocean surface, a temperature threshold is applied to the composite image to identify regions in the images that have imaged clouds rather than sea surface temperatures. For each received position report, Data Collection and Integration Unit 130 performs a two-dimensional (latitude-longitude) interpolation of the composite image to extract the sea surface temperature corresponding to the vessel location in the position report. In this case, nearest neighbor interpolation is used, although linear interpolation procedures could also be used. If the interpolated location is identified as cloud, the data record for this parameter is left blank, otherwise, the sea surface temperature value at that location is stored into Amalgamated Database 140.

In the preferred embodiment, Data Collection and Integration Unit 130 will search all the environmental parameters available in Environmental Data Aggregator 120. If a particular data source is unavailable, that particular data record is left blank.

Amalgamated Database

With further reference to FIG. 1, Amalgamated Database 140 consists of data records that contain both the real time and historical position reports with collocated environmental data. In the preferred embodiment, the PostgreSQL database system is used to store, manage, and retrieve the data records. However, in alternate embodiments, any similar type of relational database system that is capable of managing the amalgamated data records may be used.

A sample record from Amalgamated Database 140, according to the preferred embodiment of the invention is shown below:

| Field | Value |
| --- | --- |
| VESSEL_NAME | "Kathleen" |
| LATITUDE | "40.1944" |
| LONGITUDE | "−70.62" |
| DATE_TIME | "18-Jun-2005 22:16:00" |
| SPEED | "10.9433" |
| HEADING | "168.4684" |
| TRACKING_ID | "4882" |
| NAM_WINDSPEED | "14.8" |
| NAM_WINDDIR | "93.3" |
| NAM_PRESSURE | "1020.2" |
| WAM_WAVEHEIGHT | "3.6" |
| WAM_VALIDTIME | "18-Jun-2005 21:00:00" |
| WAM_INITTIME | "18-Jun-2005 06:00:00" |
| WAM_WAVEPERIOD | "5.6" |
| WAM_WAVEDIR | "85.5" |
| HYCOM_CURRENTSPD | "0.75" |
| HYCOM_CURRENTDIR | "210.2" |
| HYCOM_SURFACEANOMALY | "25" |
| AHVRR_SST | "27.4" |
| GOES_SST | "26.8" |
| GFS_WINDSPEED | "11.2" |
| GFS_WINDDIR | "96.2" |
| GFS_PRESSURE | "1019.2" |
| GFS_VALIDTIME | "18-Jun-2005 21:00:00" |
| GFS_INITTIME | "18-Jun-2005 00:00:00" |

Once the position reports and collocated environmental data are stored in Amalgamated Database 140, the data can be queried, and subsets and cross sections of the data can quickly be extracted and processed for analysis. Without Data Collocation and Integration Unit 130 and resulting Amalgamated Database 140, an application would require several separate databases to store the data, and each database query for position and environmental data would result in search through vast amounts of data across the multiple databases. Such a search would be extremely slow and unresponsive. In the present invention however, with the Data Collocation and Integration Unit 130 and Amalgamated Database 140, all the merging and integration is conducted as the position reports are collected. As a result, the collocated environmental and position data are readily available to any database client.

For example, if a gridded data set of wind measurements contains 700×500 or 350,000 data points, and a new gridded data set is received every 3 hours, there will be 8×700×500 or 2.8 million data points in one 24 hour set of wind data. In a test conducted from a computer networked locally to the Environmental Data Aggregator 120, and using the 2.8 million data points of wind data, a query for a single vessel location point took 0.811 seconds to return collocated wind speed and temperature from the Amalgamated Database 140. Subsequent queries took even less time, less than $1/100^{th}$ of a second, because of data caching.

Data and Performance Analysis Tools

With further reference to FIG. 1, Amalgamated Database 140 may be queried, and the extracted data may be by processed for analysis by Data Performance and Analysis Tools 150 and displayed or reported to the user at Web Site 180 via Web Server 170.

Figure 3:
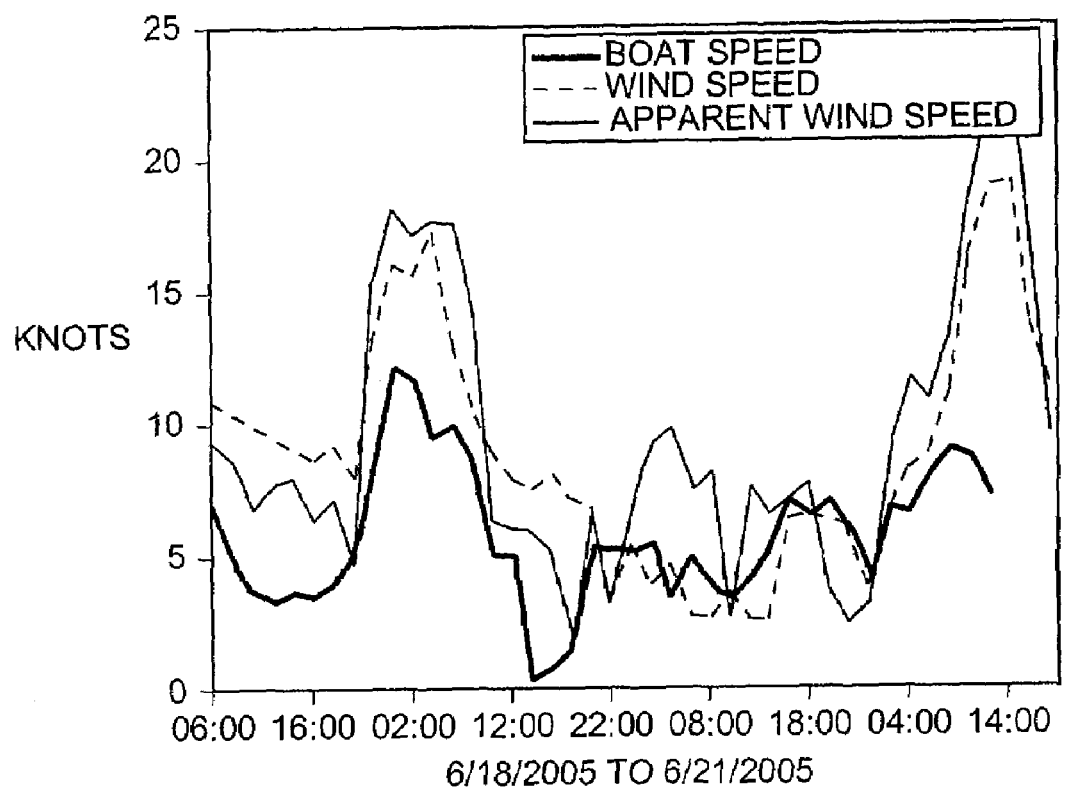
FIG. 3 is a sample plot of vessel speed versus time, in accordance with the invention of FIG. 1.
Figure 4:
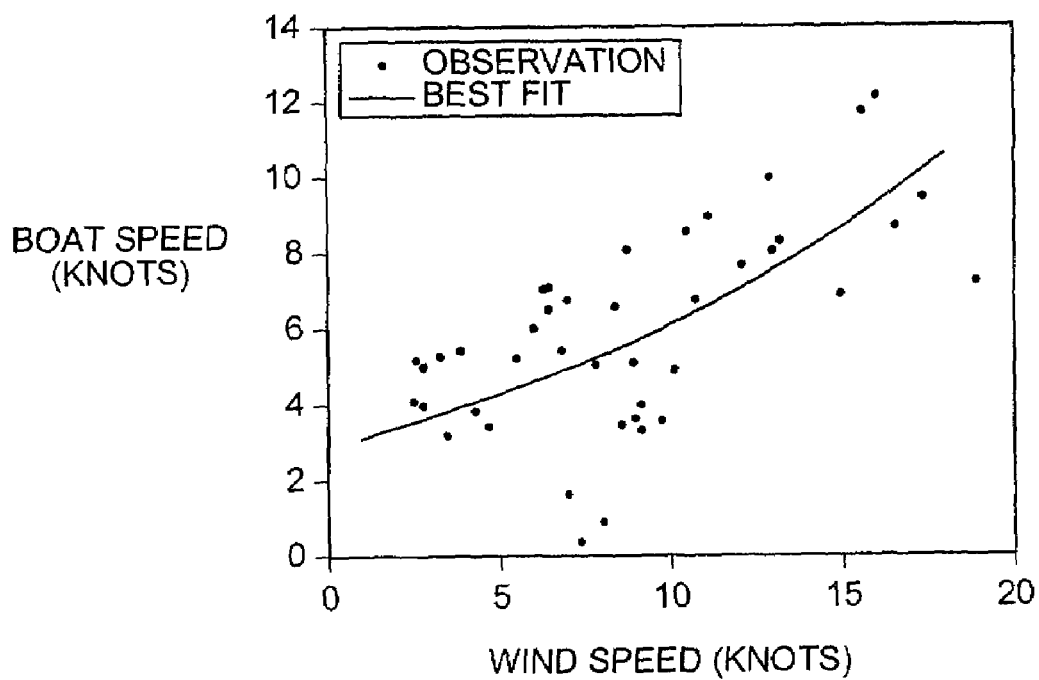
FIG. 4 is a sample plot of vessel speed versus wind speed and a least squares fit model, in accordance with the invention of FIG. 1.

In addition to simple queries, Data Performance and Analysis Tools 150 can perform statistical computations and calculate derived values. A first example is shown in FIG. 3, in which the vessel speed is plotted versus time along with the collocated wind speed. The apparent wind speed, which is the difference between the boat vector and the wind vector, is also shown for comparison. A second example is shown in FIG. 4, in which vessel speed is plotted versus the wind speed and a least squares fit model. The capabilities of Data Performance and Analysis Tools 150 could be extended even further. For example, data could be compared to polar diagrams and performance predictions for specific vessel hull shapes to determine if the vessel is operating at peak performance. Alternately, vessels within a fleet or class could be compared to determine which crew is sailing most efficiently, and may bring a new dimension to sailboat race tracking applications.

Figure 5:
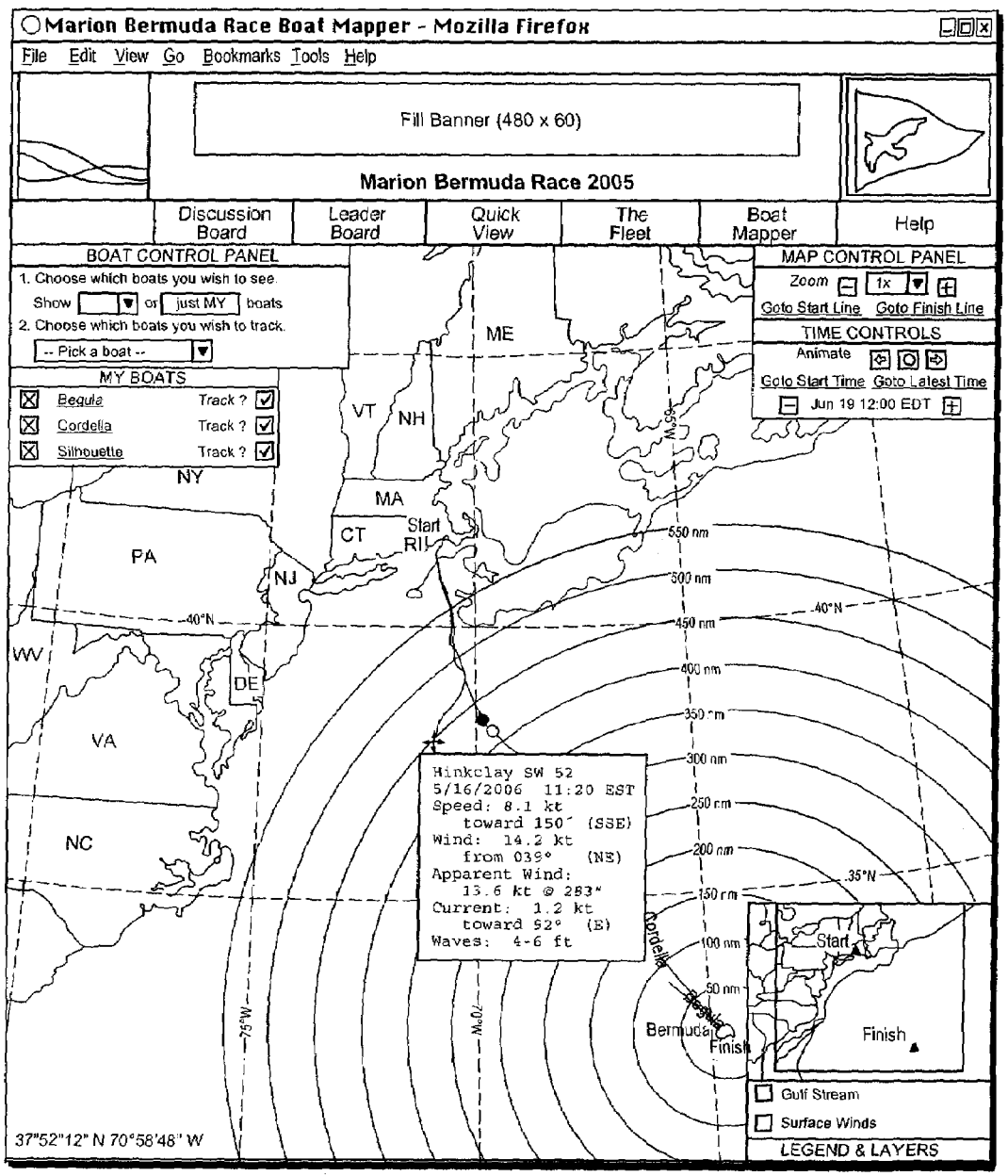
FIG. 5 is a sample web page showing environmental data collocated in space and time with vessel position in accordance with the invention of FIG. 1.

Position reports and collocated environmental data can be made available to users on the Internet via Web Server 170 and Web Site 180 using common HTTP protocols and web server technologies. An example is shown in FIG. 5, in which a yacht position in a yacht racing tracking application is indicated by a colored dot on a chart presented on a web page. If the user moves the curser with the mouse over the dot, a pop-up window will appear on the web browser that shows the vessel name along with coincident environmental parameters. This will allow the user to quickly query any vessel at any point in the race and compare wind speeds, wave heights, and ocean currents, all of which impact sailing performance.

Although specific features of the invention are shown in some drawings and not others, this is for convenience only, as the features may be combined in other manners in accordance with the invention. Other embodiments will occur to those skilled in the art and are within the following claims.

What is claimed is:

1. A method for allowing a user to query a position of a mobile asset over time, along with environmental data associated with the position of the mobile asset, comprising:
    receiving one or more position reports from the mobile asset, where each position report comprises at least a position of the mobile asset;
    associating the mobile asset position with a timestamp;
    receiving one or more environmental data reports from one or more data sources other than the mobile asset, where each environmental data report comprises at least one environmental data value and a location associated with the environmental data value;
    associating the environmental data value with a timestamp;
    correlating the position report with the environmental data report to create a correlated record;
    storing the correlated record in an amalgamated database, where each record in the amalgamated database comprises at least the mobile asset position and the mobile asset timestamp; and
    retrieving a record from the amalgamated database based on a user query.

2. The method of claim 1, where correlating the position report with the environmental data report comprises comparing the mobile asset position with the environmental data location.

3. The method of claim 1, where correlating the position report with the environmental data report comprises comparing the mobile asset timestamp with the environmental data timestamp.

4. The method of claim 1, where correlating the position report with the environmental data report comprises:
    determining if the difference between the mobile asset position and the environmental data location is within a location range; and
    determining if the difference between the mobile asset timestamp and the environmental data timestamp is within a time range.

5. The method of claim 4, where at least one of the location range and the time range is determined by the user.

6. The method of claim 1, further comprising storing the environmental data value, the associated timestamp, and the associated location in an environmental database.

7. The method of claim 6, where the environmental data location is a measurement site location and correlating the position report with the environmental data report comprises:
    searching the environmental database for a measurement site location closest to the mobile asset position; and
    using the closest measurement site location to search for an environmental data value having an associated timestamp closest to the mobile asset timestamp.

8. The method of claim 7, further comprising determining if the difference between the measurement site location and the mobile asset position is within a location range.

9. The method of claim 7, further comprising determining if the difference between the environmental data timestamp and the mobile asset timestamp is within a time range.

10. The method of claim 1, where the mobile asset position includes a longitude and a latitude, and the environmental data report comprises one or more temporally spaced sets of environmental data values, each environmental data value having an associated longitude and latitude.

11. The method of claim 10, where correlating the position report and the environmental data report comprises a two-dimensional interpolation by longitude and latitude of the environmental data report.

12. The method of claim 10, where correlating the position report and the environmental data report comprises a three-dimensional interpolation by time, longitude, and latitude of the environmental data report.

13. The method of claim 1, further comprising displaying at least the mobile asset position and the mobile asset timestamp from the amalgamated database record.

14. A method for allowing a user to query a position of a mobile asset over time, along with environmental data associated with the position of the mobile asset, comprising:

receiving one or more position reports from the mobile asset, where each position report comprises at least a position of the mobile asset;

associating the mobile asset position with a timestamp;

receiving one or more environmental data reports from one or more data sources other than the mobile asset, where each environmental data report comprises at least one environmental data value and a measurement site location associated with the environmental data value;

associating the environmental data value with a timestamp;

storing the environmental data value, the associated timestamp, and the measurement site location in an environmental database;

searching the environmental database for a measurement site location closest to the mobile asset position;

using the closest measurement site location to select, from the environmental database, an environmental data value having an associated timestamp closest to the mobile asset timestamp;

storing the selected environmental data value with the mobile asset report in an amalgamated database; and retrieving a record from the amalgamated database based on a user query.

15. The method of claim 14, where the selected environmental data value is stored in the amalgamated database if the difference between the mobile asset position and the measurement site location is within a location range and the difference between the mobile asset timestamp and the environmental data timestamp is within a time range.

16. A method for allowing a user to query a position of a mobile asset over time, along with environmental data associated with the position of the mobile asset, comprising:

receiving one or more position reports from the mobile asset, where each position report comprises at least a longitude and latitude of the mobile asset;

associating the mobile asset longitude and latitude with a timestamp;

receiving one or more environmental data reports from one or more data sources other than the mobile asset, where each environmental data report comprises one or more temporally spaced sets of environmental data values, each environmental data value having an associated longitude and latitude;

associating the environmental data value with a timestamp;

storing the environmental data value, the associated timestamp, and the associated longitude and latitude in an environmental database;

extracting an environmental data value having a longitude and latitude closest to the mobile asset longitude and latitude from the environmental database;

storing the extracted environmental data value with the mobile asset report in an amalgamated database; and retrieving a record from the amalgamated database based on a user query.

17. The method of claim 16, where a two-dimensional interpolation is used to extract an environmental data value having a longitude and latitude closest to the mobile asset longitude and latitude.

18. The method of claim 16, where an environmental data value having a longitude, latitude and timestamp closest to the mobile asset longitude, latitude and timestamp is extracted from the environmental database.

19. The method of claim 18, where a three-dimensional interpolation is used to extract an environmental data value having a longitude, latitude and timestamp closest to the mobile asset longitude, latitude and timestamp.

20. A system for allowing a user to query a position of a mobile asset over time, along with environmental data associated with the position of the mobile asset, comprising:

means for receiving one or more position reports from the mobile asset, where each position report comprises at least a position of the mobile asset;

means for associating the mobile asset position with a timestamp;

means for receiving one or more environmental data reports from one or more data sources other than the mobile asset, where each environmental data report comprises at least one environmental data value and a location associated with the environmental data value;

means for associating the environmental data value with a timestamp;

means for correlating the position report with the environmental data report to create a correlated record;

means for storing the correlated record in an amalgamated database, where each record in the amalgamated database comprises at least the mobile asset position and the mobile asset timestamp; and means for retrieving a record from the amalgamated database based on a user query.

* * * * *